United States Patent [19]

Hatori et al.

[11] 4,203,007
[45] May 13, 1980

[54] SYSTEM FOR RECEIVING REMOTE CONTROL SIGNAL IN AUTOMATIC TELEPHONE ANSWERING DEVICE

[75] Inventors: Nobuyoshi Hatori, Hoya; Eiiji Morigami, Yachiyo, both of Japan

[73] Assignee: Iwasaki Tsushinki Kabushiki Kaisha, Japan

[21] Appl. No.: 863,572

[22] Filed: Dec. 22, 1977

[30] Foreign Application Priority Data

Dec. 24, 1976 [JP] Japan .................. 51-155012
Dec. 24, 1976 [JP] Japan .................. 51-155013

[51] Int. Cl.² ............................................ H04M 1/64
[52] U.S. Cl. ................................................. 179/6 E
[58] Field of Search .............. 179/6 E, 2 A, 100.1 DR

[56] References Cited

U.S. PATENT DOCUMENTS

| | | | |
|---|---|---|---|
| 3,337,690 | 8/1967 | Martin | 179/6 E |
| 3,508,004 | 4/1970 | Waldman | 179/6 E |
| 3,511,934 | 5/1970 | Mizuno | 179/6 E |
| 3,511,935 | 5/1970 | Mizuno | 179/6 E |
| 3,647,985 | 3/1972 | Langendorf et al. | 179/6 E |
| 3,673,332 | 6/1972 | Muller et al. | 179/6 E |
| 3,867,578 | 2/1975 | Uechi | 179/6 E |
| 4,031,323 | 6/1977 | Ando et al. | 179/6 E |

Primary Examiner—Bernard Konick
Assistant Examiner—Donald E. McElheny, Jr.
Attorney, Agent, or Firm—Robert E. Burns; Emmanuel J. Lobato; Bruce L. Adams

[57] ABSTRACT

A system for receiving a remote control signal in an automatic telephone answering device, in which the remote control signal is detected from a transmission line by the use of a remote control signal detector including a filter so that a message to the transmission line is sent out in response to the detected output of the remote control signal detector. The message from a line for sending the message to the transmission line is extracted after sufficiently attenuating the remote control signal by a directional circuit. The frequency components corresponding to the remote control signal are selected by a second filter from the message extracted, so that when the filter output of the second filter is obtained, transmission of the message to the transmission line is inhibited during the duration of the filter output of the second filter.

8 Claims, 5 Drawing Figures

SYSTEM FOR RECEIVING REMOTE CONTROL SIGNAL IN AUTOMATIC TELEPHONE ANSWERING DEVICE

BACKGROUND OF THE INVENTION

1. Field of the Invention

This invention relates to a system for receiving a remote control signal in an automatic telephone answering device, which is provided with a remote control signal detector including a filter for detecting a remote control signal from a transmission line and message sending means controlled by the detected output from the remote control signal detector to send a message to the transmission line.

2. Description of the Prior Art

A conventional automatic telephone answering device of this kind is a remote-controlled automatic telephone answering and recording set. Since the automatic telephone answering and recording set utilizes a public telephone line, the frequency of the remote control signal is required to be included within the voice band. In the remote-controlled automatic telephone answering and recording set, a remote control signal detector is usually coupled to a line transformer. In this instance, the remote control signal detector is supplied with a remote control signal (a) from a telephone line and a regenerated signal (b) from a recording and playback head of the automatic telephone answering and recording set through a recording and playback amplifier. Accordingly, there is a chance where the actual remote control signal (a) and the regenerated signal (b) are simultaneously applied to the remote control signal detector. In the both signals, the remote control signal included in the signal (a) is received, but the signal (b) should not be received even if it includes a remote control signal component. To meet with the two requirements, it is customary in the prior art to stop the operation of the remote control signal detector upon detection of the regenerated signal (b) sent to the telephone line, or to temporarily stop the sending of the regenerated signal during application of the remote control signal. However, the former has a defect that no remote control signal can be received during voice detection, and the latter has a defect that the regenerated voice signal being sent out is interrupted.

SUMMARY OF THE INVENTION

Accordingly, an object of this invention is to provide a system for receiving a remote control signal in an automatic telephone answering device, in which a regenerated signal sent out from the device and a normal remote control signal applied thereto from a transmission line are discriminated from each other to prevent misoperation due to the frequency components of the regenerated signal coinciding with those of the remote control signal.

The above object and other objects of this invention can be attained by the system of this invention for receiving a remote control signal in an automatic telephone answering device, in which the remote control signal is detected from a transmission line by the use of a remote control signal detector including a filter so that a message to the transmission line is sent out in response to the detected output of the remote control signal detector. The message from a line for sending out the message to the transmission line is extracted after sufficiently attenuating the remote control signal by directional circuit means. The frequency components corresponding to the remote control signal are selected by a second filter from the message extracted, so that when the filter output of the second filter is obtained, transmission of the message to the transmission line is inhibited during the duration of the filter output of the second filter.

BRIEF DESCRIPTION OF THE DRAWINGS

The principle, construction and operation of this invention will be clearly understood from the following detailed description taken in conjunction with the accompanying drawings: in which.

DESCRIPTION OF THE PREFERRED EMBODIMENTS

Figure 1:
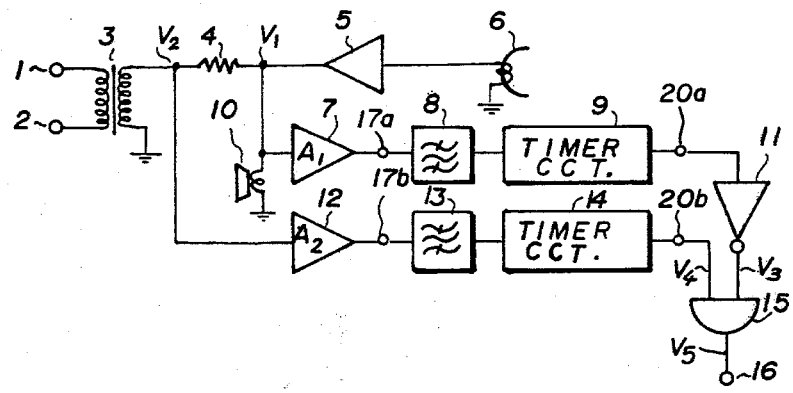
FIGS. 1 and 3 are block diagrams each illustrating an embodiment of this invention.
Figure 2:
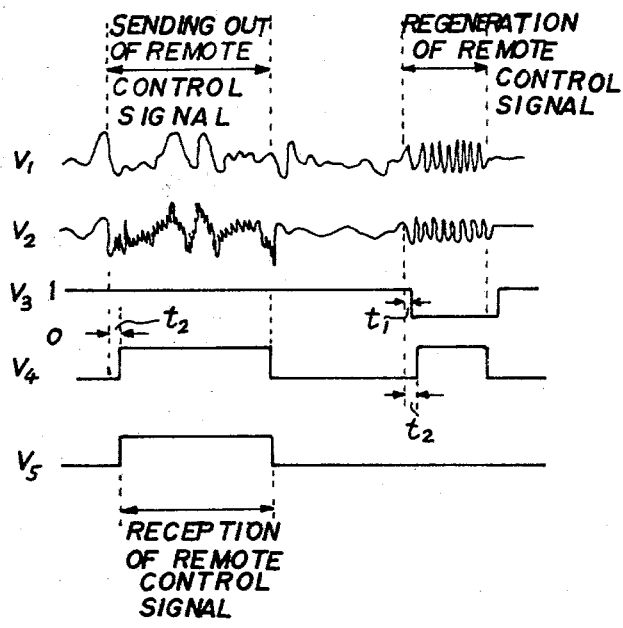
FIG. 2 is a series of waveform diagrams explanatory of the operation of the embodiments of this invention.

FIG. 1 is a block diagram illustrating an embodiment of this invention applied to a remote-controlled automatic telephone answering and recording set. Reference characters 1 and 2 indicate remote control signal input terminals connected in use to telephone line conductors; 3 designates a line transformer; 4 identifies a matching resistor of the line transformer 3; 5 denotes a voice signal sending amplifier; and 7 and 12 represent amplifiers having their individual gains $A_1$ and $A_2$. Reference characters 8 and 13 second and first band-pass filters, respectively; $\Delta f_1$ and $\Delta f_2$ indicating their individual pass bandwidths, respectively. Reference character 11 refers to an inverter; 15 indicates a gate; 9 and 14 designate second and first timer circuits respectively; 6 identifies a recording and playback head; and 10 denotes a speaker. In FIG. 2, reference numerals $V_1$ to $V_5$ show waveforms produced at respective parts of the circuit illustrated in FIG. 1. Reference 16 indicates an output terminal of a remote control signal. The recording and playback device responds to the output from the matching resistor 4 and provides a reproduced sound from the recording and playback head 6 but since the recording and playback device is known, details of it are not shown.

For the operation of the embodiment shown in FIG. 1, let it be assumed that $\Delta f_1 > \Delta f_2$, that $A_1 > A_2$ and that the band-pass filters 8 and 13 have the same center frequency $f_0$. Further, the set times $t_1$ and $t_2$ of the timer circuits 9 and 14 are assumed to be $t_1 > t_2$. When a remote control signal having a frequency included within the pass bands of the band-pass filters 8 and 13 is applied across the telephone line terminals 1 and 2, the signal passes through the line transformer 3 and is amplified by the amplifier 12. The output of the amplifier 12 is applied to the timer circuit 14 through the band-pass filter 13, so that the output of the timer circuit 14 is applied to the gate 15. At the same time, the remote control signal is applied to the amplifier 7 through the matching resistor 4, and the input of the amplifier 7 is connected to the output of the voice output amplifier 5. The voice output amplifier 5 usually has a low output impedance, so that the output from the band-pass filter 8 is very small.

Accordingly, the output $V_3$ from the inverter 11 is in the state "1" and the gate 15 in its open state. Under such conditions, the output $V_4$ from the timer circuit 14 passes through the gate 15 to provide the received output $V_5$.

Next, in the states of answering and playback by message sending means (i.e. the recording and playback device, the recording and playback head 6 and the amplifier 5 mentioned above), the voice signal from the recording and playback head 6 is amplified by the amplifier 5 to drive the speaker 10 and, at the same time, applied to the amplifiers 7 and 12 through the matching resistor 4. In this instance, if the answering or reproduced signal includes the remote control signal components of the frequency included within the pass bands of the band-pass filters 8 and 13, the input to the amplifier 7 is fed through the band-pass filter 8 to the timer circuit 9 to make the output from the inverter 11 the state "0" after the set time $t_1$ of the timer circuit 9, so that the gate 15 is closed during the duration of the output of the inverter 11. The input to the amplifier 12 through the matching resistor 4 passes through the band-pass filter 13 and is applied to the gate 15 after the set time $t_2$ of the timer circuit 14 but is not provided as the received output $V_5$ at the terminal 16 since the gate 15 is closed.

Thus, the amplifiers 5 and 7 and the matching resistor 4 provide a direction function means or directional circuit such that the input from the line transformer 3 is attenuated at the output of the amplifier 7 while the input to the voice output amplifier 5 is sent out at the output of the amplifier 7 without attenuation. That is, even if a remote control signal of the frequency lying within the pass bands of the band-pass filters 8 and 13 is included in the answering or reproduced signal, the circuit does not perform the remote control signal receiving operation but responds only to the remote control signal received at the input terminals 1, 2, and hence does not achieve any erroneous operation in response to the regenerated signal.

In practice, the time constant $t_1$ of the timer circuit 9 is set such that a remote control signal reception inhibiting circuit formed by the amplifier 7, the band-pass filter 8, the timer circuit 9 and the inverter 11 may operate only when a signal equivalent to a remote control signal is included in the answering or reproduced signal. Accordingly, substantially no inhibiting operation is performed in cases of ordinary voice signals. Consequently, during an answering operation, a reproducing operation or a voice sending operation, the remote control signal applied to the remote control signal input terminal 1, 2 is received very easily.

Figure 3:
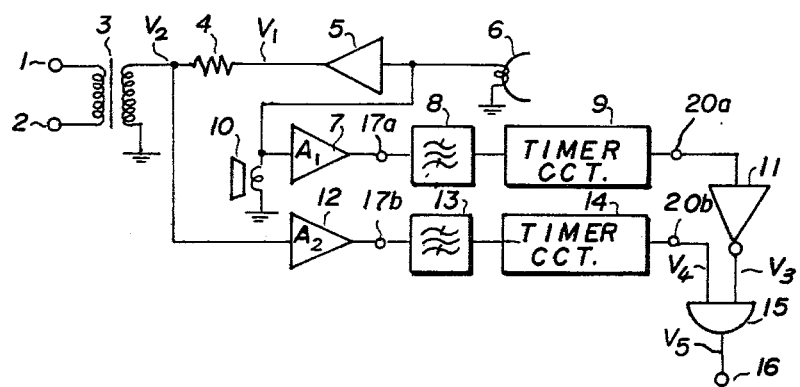

FIG. 3 illustrates another embodiment of this invention, in which the input point of the waveform $V_1$ to the amplifier 7 is connected to the input side of the amplifier 5, thereby ensuring to maintain the abovesaid direction function means. In this case, since the voice signal from the recording and playback head 6 is directly applied to the amplifier 7, the resultant amplification degree of the pair of amplifiers 5 and 7 in FIG. 1 is selected to be equal to that of the single amplifier 7 in FIG. 3. It is possible, of course, that if the amplifier 5 is an amplifier having a plurality of stages, the input to the amplifier 7 is picked up from a connection junction between an adjacent pair of the stages.

As has been described in the foregoing, the present invention has advantages that when remote control signals are applied from two directions, the input from only one direction is received as a normal remote control signal and that this reception is not disturbed by the signal from the other direction, as is much as possible. Accordingly, this invention is of great utility when applied to the remote-controlled playback operation in the automatic telephone answering device.

A user calls the above automatic telephone answering device with a dial signal from a remote place and achieves a remote control operation to send a remote control signal to perform various operations, as is well-known. Namely, this device is adapted to respond to the remote control signal to carry out operations such as changing over a customer's message recording tape to the playback state, of entirely rewinding the message recording tape, and of rewinding a part of the tape when the user failed to catch the customer's message or the like.

Accordingly, in a case of effecting such a variety of operations, the use of two or more kinds of remote control signals makes the control relatively easy but leads to complicated and expensive circuit structures for the receiving circuit and so on. Many conventional devices of this kind employ a single frequency as a remote control signal and performs various operations using the frequency as a "key".

With such devices designed to receive a remote control signal of a single frequency, however, in order to prevent an erroneous operation due to noise or the like, it is necessary to provide a detection time so that the device do not operate unless the remote control signal is continuously applied over the detection time.

This detection time is required to be long enough to permit the prevention of misoperation but to be as short as possible to be practical. In the prior art, however, the devices are adapted not to effect various operations unless the remote control signal is applied to the device for a relatively long period of time so as to ensure the operations. Further, the remote control signal detection time is defined to be fixed in common to all states, such as the initial state of changing over the message recording tape to the playback condition and the state of rewinding the tape to a desired part where the user failed to catch the recorded content. Accordingly, when achieving the remote control operation, it is always necessary to apply the remote control signal to the device for a considerably long period of time, and this leads to the defects of poor operational performance.

Such defects of the prior art system, can be eliminated by a modification of this invention, which is designed to use a predetermined detection time of an ordinary duration when receiving a first remote control signal and to change over the abovesaid detection time to a shorter detection time when receiving second and subsequent remote control signals following the reception of the first one, thereby to enhance the operational performance.

With reference to the drawings, the modification of this invention will hereinafter be described in detail.

Figure 4:
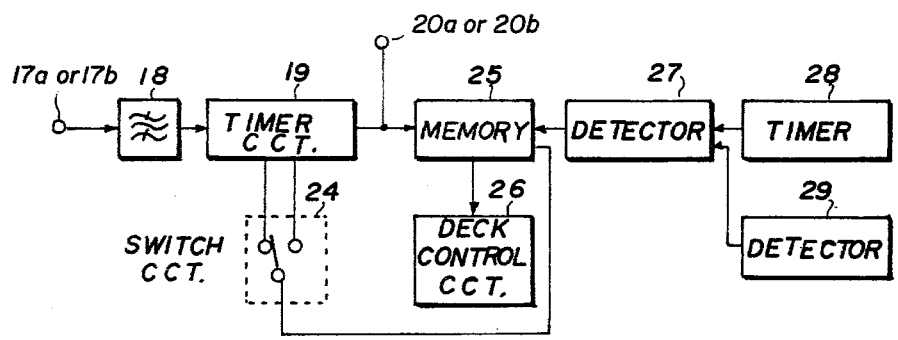
FIG. 4 is a block diagram illustrating a modification of a part of each of the embodiments shown in FIGS. 1 and 3.

FIG. 4 is a block diagram illustrating the modified part of this invention. Reference numeral 17a and 17b designate a remote control signal input terminal pair for receiving output signals from the amplifiers 7 and 12 or ; 18 designates a band-pass filter for the frequency selection operation, 19 identifies a timer; 24 denotes a time change-over switch of the timer 19; 25 represents a memory of a remote control signal; and 20a, 20b designate a detection output terminal pair respectively connected to each of the inverter 11 and one input to the gate 15. In this modification, each of a series connection of the filter 8 and the timer circuit 9 and a series connection of the filter 13 and the timer circuit 14 in FIG. 1 or 3 is replaced by a respective path from the terminal 17a or 17b to the terminal 20a or 20b in FIG. 4.

In the present modification, when a remote control signal of a frequency included in the pass-band of the band-pass filter 18 is applied to the input terminal 17, the signal passes through the band-pass filter 18 and is applied to the timer 19. If the input signal continues for an initial time, i.e. a predetermined time $T_1$ of the timer circuit 19 which is preset by the switch 24 to be shorter than such an extent as not to cause an erroneous operation, a remote control detection output signal is obtained at the terminal 20. In this case, by selecting the time $T_1$ initially preset in the timer circuit 19 to be in the range of several hundred milliseconds to several seconds so that no output is produced by noise at the terminal 20 in a case of effecting the remote control in the frequency discrimination system using a single frequency, the function of a "key" can be provided.

When the circuit has once been opened by the "key", subsequent misoperations are negligible to some extent. For the remote control in an automatic telephone answering and recording set to which this invention is applied, an excellent operational performance is desirable. To enhance the operational performance, the memory 25 is actuated by the remote control detection output obtained at the terminal 20 and the change-over switch 24 is actuated by the output of the memory 25 to switch the discrimination time of the timer circuit 19 from the initial time $T_1$ to a shorter one $T_2$. For receiving the subsequent remote control signals, a short-time receiving operation is achieved, and even during voice signal sending of the remote-controlled automatic telephone answering and recording set, the remote control signals can be received easily and in a short time.

Figure 5:
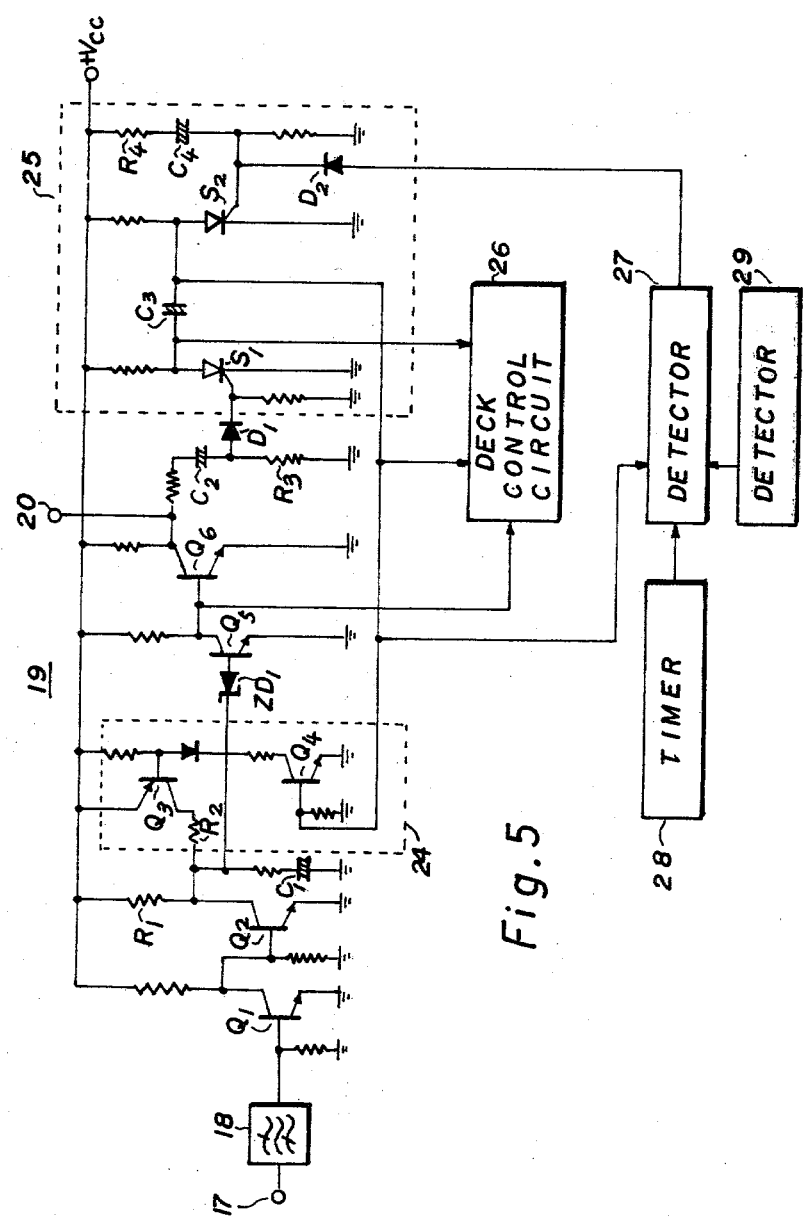
FIG. 5 is a circuit diagram illustrating an example of the modification shown in FIG. 4.

Next, FIG. 5 shows circuit details of this modification. In FIG. 5, reference numeral 17 indicates an input terminal, which is connected to the amplifier 7 or 12; 18 designates a frequency selector for a remote control signal such as a band-pass filter or the like; 19 identifies a timer circuit for detecting the remote control signal; 24 denotes a switching circuit for switching the time constant of the timer circuit 19; 25 represents a remote control memory circuit; 26 shows a conventional deck control circuit including a motor and a solenoid; 27 refers to a detector for detecting termination of the remote control operation; 28 indicates a timer for limiting the duration of the remote control operation; and 29 designates a detector for detecting termination of the remote-controlled playback operation.

When the electric power is supplied to the device of FIG. 5, a thyristor $S_2$ of the remote control memory circuit 25 is triggered by a resistor $R_4$ and a capacitor $C_4$ into the ON state and a thyristor $S_1$ is turned OFF. Under this condition, when a remote control signal is received from the input terminal 17, this signal is frequency-selected by the band-pass filter 18 and then applied to the timer circuit 19, turning ON a transistor $Q_1$ and turning OFF a transistor $Q_2$. Upon turning OFF the transistor $Q_2$, a capacitor $C_1$ is charged through a resistor $R_1$ and, after the period of the time constant $T_1$ ($\simeq C_1 \cdot R_1$), turns ON a transistor $Q_5$ and turns OFF a transistor $Q_6$ through a Zener Diode $ZD_1$.

Upon turning OFF the transistor $Q_6$, a deviation in its collector voltage is differentiated by a capacitor $C_2$ and a resistor $R_3$ so that the resulting differentiated output pulse turns ON the thyristor $S_1$ of the remote control memory circuit 25. Upon turning ON of the thyristor $S_1$, the thyristor $S_2$ is turned OFF by a capacitor $C_3$. When the thyristor $S_1$ is turned ON and the thyristor $S_2$ OFF as mentioned above, the deck control circuit 26 controls the tape rewinding and playback operations, and the reproduced voice signal is transmitted to the calling party over the telephone line, permitting the calling party to hear the reproduced content at a remote place. In this instance, if the calling party sends out a remote control signal again for rehearing a part of or the entire tape content, the remote control signal applied from the input terminal 17 passes through the frequency selector 18 to the transistor $Q_2$ in the same manner as described above. Upon turning OFF of the transistor $Q_2$, the capacitor $C_1$ is charged through the resistor $R_1$ but, in this case, since the thyristor $S_2$ of the remote control circuit memory 25 is in the OFF state, a transistor $Q_4$ of the switching circuit 24 is turned ON and a transistor $Q_3$ is also turned ON. As a result of this, a resistor $R_2$ is connected in parallel to the resistor $R_1$ through the collector-emitter path of the transistor $Q_3$. The capacitor $C_1$ is charged by the parallel circuit of the resistors $R_1$ and $R_2$ and, after the period of the time constant $T_2$ ($\simeq C_1 \cdot R_1 / R_2$), turns ON the transistor $Q_5$ through the Zener diode $ZD_1$, permitting the deck control circuit 26 to rewind and play back the tape.

By selecting the time constants to bear such a relationship that $T_1 > T_2$, the remote control performance during the remote control operation is remarkably improved. The detector 27 for the termination of the remote control operation detects termination of the remote control by means of the timer 28 and the detector 29 for the termination of the remote-controlled playback operation, and turns ON the thyristor $S_2$ and turns OFF the thyristor $S_1$ of the remote control memory 25, resetting it and putting the timer circuit 24 into its initial state.

As described in the foregoing, according to this modification, in the reception of a remote control signal of a single frequency, for example, in the reception of a remote control signal for a remote-controlled automatic telephone answering and recording set or the like, the function of a "key" is provided and even during a remote-controlled playback operation, a remote control operation can be effected easily and in a short time, thereby to provide for enhanced operational performance. Accordingly, this modification is of great utility when employed in the reception of a remote control signal.

What we claim is:
1. A system for receiving a remote control signal in an automatic telephone answering device, comprising:
remote control signal detection means for detecting a remote control signal transmitted in operation over a telephone transmission line, said remote control signal detection means comprising a first filter for passing the remote control signal and a first timer circuit responsive to the remote control signal passed by said first filter for developing a detector output signal after a first predetermined time interval;
an output signal sending amplifier for amplifying an output message signal;
message sending means controlled by the detector output signal from said remote control signal detection means for sending a message signal through said output signal sending amplifier to the transmis- sion line in operation in response to the detector output signal;

directional circuit means for extracting the signals flowing through the transmission line in operation and for developing an output signal including the message signal unattenuated and the remote control signal attenuated;

filter means including a second filter and a second timer circuit controlled by the output of said second filter and cooperative with said directional circuit means for filtering the frequency components of the remote control signal from the message signal extracted by said directional circuit means; and control means connected to said remote control signal detection means, said message sending means and said filter means for inhibiting said message sending means in response to the detector output of said remote control signal detection means during the duration of the output of said filter means.

2. A system for receiving a remote control signal in an automatic telephone answering device according to claim 1, wherein a sending path includes the sending amplifier and a matching resistor connected between the sending amplifier and the transmission line and wherein the input side of the second filter is connected between the sending amplifier and the matching resistor.

3. A system for receiving a remote control signal in an automatic telephone answering device according to claim 1, wherein the input side of the second filter is connected to the input side of the sending amplifier.

4. A system for receiving a remote control signal in an automatic telephone answering device according to claim 1, wherein the pass bandwidth of the second filter is set to be wider than that of the first filter of the remote control signal detection means.

5. A system for receiving a remote control signal in an automatic telephone answering device according to claim 1, wherein the time constant of the first timer circuit for detecting the remote control signal in said remote control signal detection means is set to be longer than the time constant of the second timer circuit for obtaining the output of said filter means.

6. A system for receiving a remote control signal in an automatic telephone answering device according to claim 1, wherein each of said first timer circuit and said second timer circuit includes time control means for switching the detection time thereof from a predetermined first time to a predetermined second time shorter than the predetermined first time when the duration of the output thereof exceeds said predetermined first time, and second time control means for restoring the detection time thereof from the predetermined second time to the predetermined first time when termination of the operation of said message sending means is detected.

7. A system for receiving a remote control signal in an automatic telephone answering device according to claim 6, wherein said termination of the operation of said message sending means is detected by a timer for limiting the duration of the remote control operation by said remote control signal.

8. A system for receiving a remote control signal in an automatic telephone answering device according to claim 6, wherein said termination of the operation of said message sending means is detected by a detector for detecting termination of the remote-controlled playback operation by said remote control signal.

* * * * *